US012620024B2

(12) United States Patent
Lau et al.

(10) Patent No.: US 12,620,024 B2
(45) Date of Patent: May 5, 2026

(54) METHOD AND SYSTEM FOR PREDICTING USER INTENTIONS WITHIN A DIGITAL BANKING APPLICATION

(71) Applicant: Royal Bank of Canada, Toronto (CA)

(72) Inventors: Alex T. Lau, Toronto (CA); Juan Martin, Toronto (CA); Gautam Dhall, Toronto (CA); Neil Mendonca, Toronto (CA); Charles Thomson, Toronto (CA); Arup Saha, Toronto (CA); Jigisha Patel, Toronto (CA); Roop Malhans, Toronto (CA); Yuanfu Tian, Toronto (CA)

(73) Assignee: Royal Bank of Canada, Toronto (CA)

( * ) Notice: Subject to any disclaimer, the term of this patent is extended or adjusted under 35 U.S.C. 154(b) by 5 days.

(21) Appl. No.: 18/933,772

(22) Filed: Oct. 31, 2024

(65) Prior Publication Data

US 2025/0139696 A1     May 1, 2025

Related U.S. Application Data

(60) Provisional application No. 63/594,515, filed on Oct. 31, 2023.

(51) Int. Cl.
   *G06Q 40/02*      (2023.01)
   *G06N 20/00*      (2019.01)
(52) U.S. Cl.
   CPC .......... *G06Q 40/022* (2025.08); *G06N 20/00* (2019.01); *G06Q 40/02* (2013.01)

(58) Field of Classification Search
   CPC ....... G06Q 40/02; G06Q 40/022; G06N 20/00
   See application file for complete search history.

(56) References Cited

U.S. PATENT DOCUMENTS

| | | | | |
|---|---|---|---|---|
| 2021/0383360 A1* | 12/2021 | Sinha | .................... | G06Q 20/405 |
| 2023/0342821 A1* | 10/2023 | Thirles | ............... | G06Q 30/0282 |
| 2023/0342831 A1* | 10/2023 | Nath | .................. | G06Q 30/0631 |

OTHER PUBLICATIONS

N. Chitsazan, S. Sharpe, D. Katariya, Q. Cheng, and K. Rajasethupathy, "Dynamic Customer Embeddings for Financial Service Applications," ArXiv, pp. 1-7, Jun. 2021. arXiv:2106.11880v1.

(Continued)

*Primary Examiner* — Scott C Anderson

(57)                ABSTRACT

Methods for using and training a classifier to predicting user intentions as the user navigates in a digital banking application. A pathway dataset, excluding financial information, is acquired, capturing a sequence of navigation events during a user session. These navigation events, representing user interactions with the application interface, are converted into a sequence of latent space representations and input into a classifier. The classifier is trained using a historical dataset of navigation events annotated with intention labels as ground truth. Upon identifying a predicted user intention, the method suggests a corresponding service via the graphical user interface (GUI). This method ensures accurate intention prediction without accessing sensitive financial information, so that privacy and usability in digital banking environments are enhanced.

19 Claims, 6 Drawing Sheets

(56)         References Cited

OTHER PUBLICATIONS

S. M. Abu-Soud, "A Novel Approach for Dealing with Missing Values in Machine Learning Datasets with Discrete Values," 2019 International Conference on Computer and Information Sciences (ICCIS), Sakaka, Saudi Arabia, Apr. 2019, pp. 1-5, doi: 10.1109/ICCISci.2019.8716430.

H. Yousuf, M. Lahzi, S. Salloum, K. Shaalan, "A Systematic Review on Sequence-to-Sequence learning with Neural Network and its Models" International Journal of Electrical and Computer Engineering, vol. 11, No. 3, Jun. 2021, pp. 2315-2326. ISSN: 2088-8708, DOI: 10.11591/ijece.v11i3.

S. Sharma, "Epoch vs Batch Size Vs iterations," Medium, pp. 1-12, Sep. 23, 2017. Retrieved from the Internet <URL: https://medium.com/data-science/epoch-vs-iterations-vs-batch-size-4dfb9c7ce9c9>.

* cited by examiner

METHOD AND SYSTEM FOR PREDICTING USER INTENTIONS WITHIN A DIGITAL BANKING APPLICATION

CROSS-REFERENCE TO RELATED APPLICATIONS

The present applications claims priority to U.S. provisional patent application No. 63/594,515, filed on Oct. 31, 2023, and entitled, "Method and System for Predicting User Intentions within a Digital Banking Application," the entirety of which is hereby incorporated by reference herein.

TECHNICAL FIELD

The present disclosure relates to methods, systems, and techniques for predicting user intentions in a digital banking application. More particularly, the present disclosure relates to methods, systems, and techniques for predicting user intentions using navigation information and neural network (s), without accessing the user's sensitive financial data such as transaction details, account balances, and withdrawal amounts.

BACKGROUND

The digital landscape, particularly in the banking sector, has undergone significant changes in recent years. As consumers increasingly turn to mobile and online platforms for their financial transactions, digital banking applications have become an essential touchpoint between financial institutions and their customers. The ubiquity of smartphones and the convenience of digital transactions have led to a tremendous increase in mobile-first transactions in the banking industry.

In this era of digital transformation, the user experience (UX) of mobile applications plays a critical role in determining customer satisfaction and retention rates. A seamless and intuitive UX not only ensures smooth transactions, but also builds trust and confidence in the digital platform. Historically, banking applications have focused primarily on providing secure and efficient transaction capabilities. However, with the evolving expectations of the modern user, there is a growing emphasis on personalizing the user experience based on individual preferences and behaviors.

SUMMARY

According to a first aspect, there is provided a method comprising: acquiring a pathway dataset excluding financial information as a user navigates in a digital banking application in a current user session, the pathway dataset comprising a time-ordered sequence of navigation events that have occurred in the current user session, wherein each of the navigation events is an interactive action by the user with an application interface of the digital banking application; converting the pathway dataset into a sequence of latent space representations; inputting the sequence of latent space representations to a classifier; in response to the classifier identifying the sequence of latent space representations to be one of the plurality of intention labels, assigning the identified intention label as a predicted user intention; and suggesting a service corresponding to the predicted user intention via a graphic user interface (GUI) of the digital banking application. The classifier is trained by acquiring a training dataset excluding the financial information, the training dataset comprising a plurality of historical navigation events, wherein at least one of the plurality of historical navigation events is annotated with one of a plurality of intention labels as ground truth; converting the training dataset into at least one training sequence of latent space representations; and training the classifier using the at least one training sequence of latent space representations and the annotated one of the plurality of intention labels.

In some embodiments, converting the pathway dataset may further comprise vectorizing the sequence of latent space representations into a pathway feature vector, and wherein converting the training dataset may comprise vectorizing the at least one training sequence of latent space representations into at least one training feature vector.

In some embodiments, the classifier may identify the sequence of latent space representations to be one of the plurality of intention labels in response to determining that a confidence level associated with the one of the plurality of intention labels exceeds a predefined confidence threshold.

In some embodiments, the method may further comprise recording, by a tracking service module, actions of the user as the user is navigating in the digital banking application in the current user session to generate the pathway dataset.

In some embodiments, the training dataset may further comprise a plurality of historical identifiers of a screen of the GUI of the digital banking application, wherein at least one of the plurality of historical identifiers of the screen is annotated with one of the plurality of intention labels by the human.

In some embodiments, the pathway dataset may further comprise a plurality of identifiers of the screen of the GUI that have occurred in the current user session.

In some embodiments, the plurality of intention labels may comprise at least one of paying bills, transferring funds, or email money transfer.

In some embodiments, the training dataset may be collected from a plurality of historical users, and wherein, for each of the plurality of historical users, the plurality of historical navigation events may be from different user sessions of the digital banking application.

In some embodiments, the user may be one of the plurality of historical users.

In some embodiments, the classifier may have a feedforward neural network architecture characterized by five distinct hidden layers.

In some embodiments, the five hidden layers in sequence may host 100, 250, 200, 100, and 50 neurons, respectively.

In some embodiments, the classifier may have a convolutional neural network architecture comprising three 1-dimensional convolutional layers.

In some embodiments, the three 1-dimensional convolutional layers may comprise 32 filters, 128 filters, and 128 filters, respectively, and wherein the three 1-dimensional convolutional layers may have a kernel size of 3, 5, and 5, respectively In some embodiments, converting the training dataset may further comprise: in response to the historical navigation events in the training dataset that precipitate a first historical navigation event annotated with one of a plurality of intention labels being fewer than a predetermined number, padding the training dataset to meet the predetermined number; and converting the predetermined number of historical navigation events into the sequence of latent space representations.

In some embodiments, the predetermined number may range from 30 to 70.

In some embodiments, the conversion of the training dataset may be performed using a look-up table or an encoder.

In some embodiments, the conversion of the pathway dataset may be performed using a look-up table or an encoder.

In some embodiments, the training dataset may be acquired from a web analytics service used to monitor the digital banking application.

In some embodiments, the classifier may have an output layer characterized by three neurons.

In some embodiments, the training may undergo a duration ranging from 30 epochs to 70 epochs.

According to a second aspect, there is provided a method for training a classifier to predict a user intention within a digital banking application, the method comprising: acquiring a training dataset excluding financial information, the training dataset comprising a plurality of historical navigation events, wherein at least one of the plurality of historical navigation events is annotated with one of a plurality of intention labels as ground truth; vectorizing the training dataset into at least one training feature vector; and training the classifier using the at least one training feature vector and the annotated one of the plurality of intention labels.

According to a third aspect, there is provided a non-transitory computer readable medium have stored thereon computer program code that is executable by at least one processor and that, when executed by the at least one processor, causes the at least one processor to perform a method comprising: acquiring a pathway dataset excluding financial information as a user navigates in a digital banking application in a current user session, the pathway dataset comprising a time-ordered sequence of navigation events that have occurred in the current user session, wherein each of the navigation events is an interactive action by the user with an application interface of the digital banking application; converting the pathway dataset into a sequence of latent space representations; inputting the sequence of latent space representations to a classifier; in response to the classifier identifying the sequence of latent space representations to be one of the plurality of intention labels, assigning the identified intention label as a predicted user intention; and suggesting a service corresponding to the predicted user intention via a graphic user interface (GUI) of the digital banking application. The classifier is trained by acquiring a training dataset excluding the financial information, the training dataset comprising a plurality of historical navigation events, wherein at least one of the plurality of historical navigation events is annotated with one of a plurality of intention labels as ground truth; vectorizing the training dataset into at least one training feature vector; and training the classifier using the at least one training feature vector and the annotated one of the plurality of intention labels.

According to a fourth aspect, there is provided a neural network trained in accordance with the method described herein.

This summary does not necessarily describe the entire scope of all aspects. Other aspects, features and advantages will be apparent to those of ordinary skill in the art upon review of the following description of specific embodiments.

BRIEF DESCRIPTION OF THE FIGURES

In the accompanying drawings, which illustrate one or more example embodiments.

DETAILED DESCRIPTION

Figure 1:
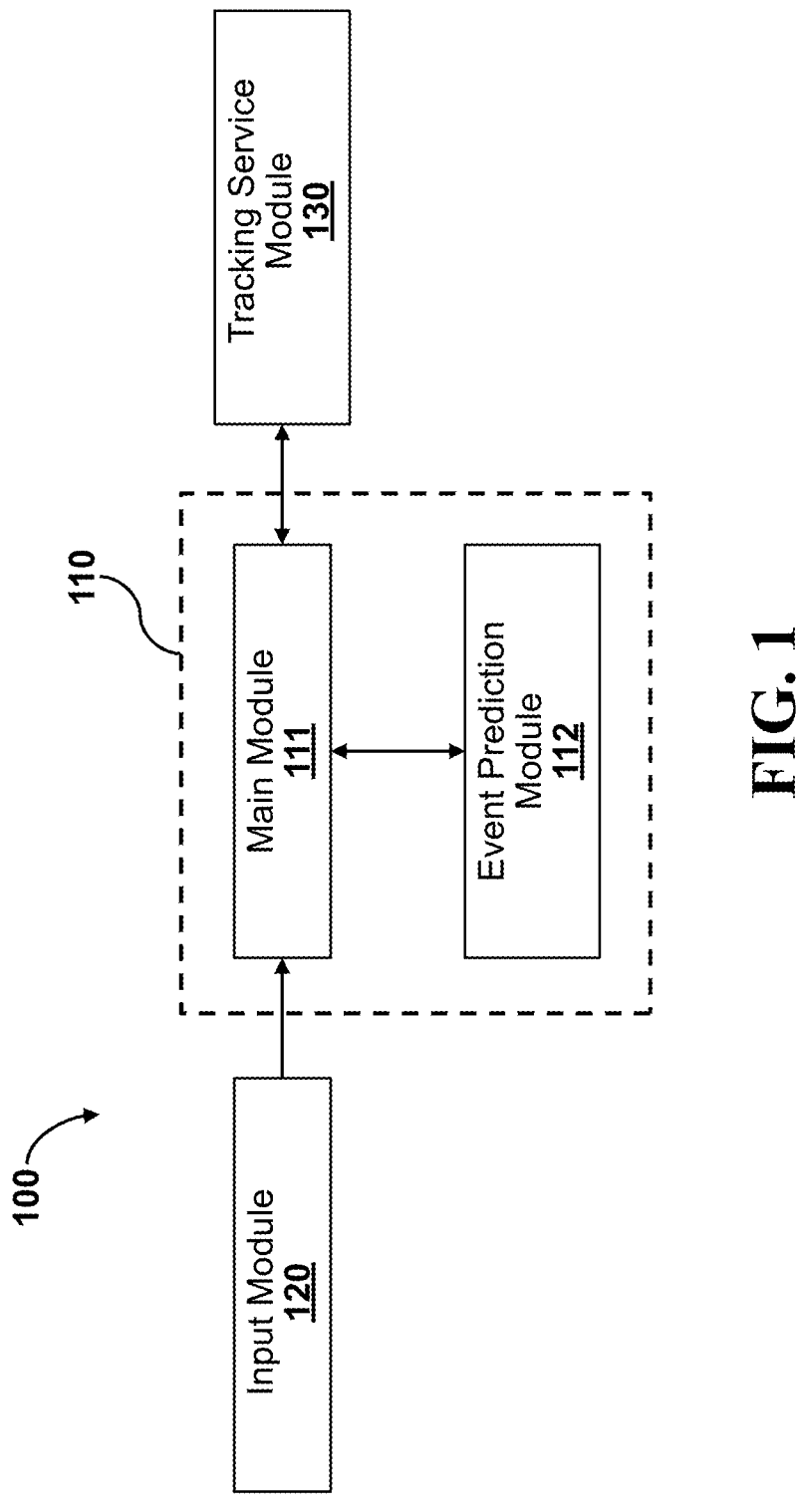
FIG. 1 depicts a block diagram showing a system for user intention prediction, according to an example embodiment.

In today's digital ecosystem, accurately identifying and predicting user intention is a key strategy for improving user experience. Digital banking applications striving for maximum efficiency can gain a competitive edge by skillfully anticipating user needs and actions. They can promptly present users with relevant options and direct them to the desired page or functionality. This proactive approach not only shortens transaction times, but also significantly reduces user frustration. Such timely intervention, backed by predictive intelligence, not only cultivates an intuitive interface, but also builds user engagement, trust, and loyalty. By facilitating a more direct path based on these predictions, users can quickly accomplish various banking tasks. This efficiency is especially advantageous for digital banking platforms, which are increasingly becoming the preferred mode of interaction in an era where digital engagement is eclipsing traditional brick-and-mortar banking interactions.

However, digital banking presents a unique set of challenges when it comes to predicting user intention. Unlike many applications that offer predictable or linear navigation, there may be multiple paths for a user to take within a banking application to be able to perform specific functions or to acquire specific information; users perform actions to transition between application states along each of those paths. The complexity of these applications stems from the vast array of services they provide, the stringent regulatory landscape they navigate, and the need to serve a diverse population with varying financial behaviors and preferences. Furthermore, in the digital banking context in particular, for privacy and cybersecurity reasons a digital banking platform may wish to avoid unnecessarily accessing or using a user's personal financial information. Being able to determine user intention without access to that sensitive information represents a technical problem in respect of training neural network(s) to predict user intention without information that, from a technical perspective alone, would be valuable for training.

Digital banking platforms, supported by neural networks and more particularly deep learning models, have progressed beyond simply facilitating user interaction. With the embodiments in the present disclosure, they now actively guide and anticipate user behavior, analyzing past patterns to predict and streamline upcoming actions. In the context of this disclosure, "financial information" refers to any personal or sensitive data representative of a user's financial status or activity. This includes actual account transaction details, such as bank account balances, amounts of withdrawals, deposits, and transfers, as well as any information regarding the user's financial products, such as loans, mortgages, and investments. Essentially, it covers all data points that reflect the flow of money in and out of a user's accounts or the specific financial assets and liabilities held by the user. This disclosure addresses the challenge of predicting user intentions without requiring access to these sensitive financial details, which not only enhances user privacy, but also reduces the risk of exposure to cybersecurity threats.

In one embodiment, a method is disclosed that focuses on training a classifier designed for predicting the intentions of users while they interact with a digital banking application. Notably, the method facilitates the protection of user confidentiality by eliminating the necessity to access explicit financial information associated with a user.

The process begins with the acquisition of a training dataset. This dataset includes at least one event pathway each comprising one or more navigation events that precipitate a user intention. The training dataset includes one or more events that have occurred during previous or historical user sessions. A "user session" refers to a period between logging in and logging out of a service, during which the user interacts via a graphical user interface (GUI) with the service. For example, if a user logs into two different services, such as a "direct investing" service during which the user manages investments and a "personal banking" service during which the user manages a chequing account, even if accessed consecutively, each would be treated as a distinct session. The dataset may contain data collected from one or more individuals during one or more historical sessions. For each session, a number of navigation events may be included in the dataset. Each navigation event may capture useful data points such as a specific screen name within the digital banking application where the event occurred, and a detailed record of the actions or commands a user performed on that screen. The navigation event used for training may or may not include a unique user identity.

A digital banking application, as used herein, refers to a comprehensive set of electronic interfaces that facilitate banking and financial activities by communicating with an underlying digital infrastructure. Digital banking applications include, but are not limited to, mobile applications for smartphones and tablets, web-based platforms accessible through Internet browsers, and dedicated software programs installed on personal computers or other devices. Through these applications, users can perform a variety of banking tasks, such as paying bills, transferring funds between accounts, creating email money transfers, or exploring other financial products and services. In the absence of predictive user intention capabilities, a typical user's journey within the application can involve multiple steps: they may first navigate through the application's home page or dashboard, meander through various menu options or tabs, and perhaps even move back and forth between different sections before finally arriving at the page they need to complete a specific transaction. This process can be time-consuming and, at times, frustrating for users who want quick and easy access to their banking needs.

In a digital banking application, as users navigate and interact, a variety of data points are captured in what is known as a "navigation event". A navigation event is a digital footprint of the user's actions with the application's GUI that causes one state of the user interface to transition to another state of the user interface. In an example embodiment, this event may encapsulate data fields such as "date" and "timestamp", providing a chronological context to the user's interaction. A visitor's identity ("fullVisitorId") field may uniquely identify a user, ensuring that the system can distinguish between different users and their respective actions. Meanwhile, a session identifier ("visitId") field may provide a session-specific identifier, allowing analysts to distinguish between multiple visits by the same user. A name of the screen ("screenname") field may record the specific section or page of the application that the user is currently viewing and capture keywords representing said section or page, whether it is the account overview, funds transfer, loan application, or any other module. An event label ("eventLabel") field, on the other hand, may provide a more granular view by documenting specific actions taken by the user on that screen, such as clicking a button, submitting a form, or toggling an option. In a typical example, the screen name and the event label are the data encompassed in the navigation event.

It is worth noting, however, that navigation events can capture more than just these basic data points. Advanced tracking systems, which often run discreetly in the background, may be equipped to monitor and record a wide range of user interactions. For example, they can capture real-time screenshots, providing a visual representation of the user's view at any given moment. The user's cursor movements, which can indicate areas of interest or hesitation, may also be recorded. Direct interactions, such as mouse clicks or keystrokes, provide clear insight into user choices and commands. Dwell time, or the amount of time a user spends on a particular screen or section, can indicate either engagement or confusion, depending on the context.

While such detailed navigation event data is inherently rich, it can be even more revealing when aggregated and analyzed. This provides the foundation for understanding user behavior and preferences. While specific tools such as Google Analytics™ have popularized such data collection, the concept applies more generally to any robust digital application monitoring and optimization platform.

Then, a labeling of the navigation events may be initiated. In this example, sequential navigation events from the same past user session are annotated with a user intention. The user intention indicates the user intention within the digital banking application and may be typically in the form of a string. The labeling may be based on the information contained in the navigation events, especially the screen name and specific user actions. Through this process, the identified intentions for the navigation events from the same session are labeled to be a same intention category, such as transferring funds between accounts. However, it should be understood that the labeling is optional and the training dataset may be pre-labeled by a third party.

Afterwards, the method may comprise performing a vectorizing phase. The result is a feature vector or a collection of feature vectors, each of which associates sequential navigation events from the same session with a user intention; the start point of the sequential navigation events may be a specific navigation event or may be determined by predetermining a set number of navigation events that occurred prior to an endpoint determined to be the user intention. For the same session, one or more of navigation events may represent the user intention if the information from the screen name or the action performed by the user indicates that they correspond to one of a number of predefined intention labels of interest. That is, the navigation events may represent the user's pathway leading to the user intention. Thus, the feature vector may be represented by the user intention (in the form of an intention label) and a chronologically ordered sequence of navigation events from the event pathway (prior to the navigation event annotated with one of the intention labels), in which the navigation events are converted to latent space representations such as in the form of numerical values, for the case of processing by the classifier.

The feature vectors are then fed into a classifier that is to be trained. This classifier, characterized by its deep architecture including multiple hidden layers and a distinct output layer, is prepared for training. One such architecture may be a feedforward neural network, which refers to the structured arrangement and interconnection of artificial neurons designed to emulate certain aspects of human neural networks. One advantage of using feedforward neural network is its ability to capture complex, non-linear relationships within data due to its depth and the forward flow of information from input to output without looping back. Alternatively, a convolutional neural network (CNN) may be used, which leverages 1-dimensional convolutional layers to capture temporal invariance in time-series data. For example, the CNN may include three convolutional layers with 32, 128, and 128 filters, respectively, and kernel sizes of 3, 5, and 5, followed by global average pooling and a softmax output layer. As training progresses, the classifier may undergo iterative refinements. With each cycle, the model's internal parameters such as weights and biases may be recalibrated through an optimization procedure. This meticulous adjustment aims to reduce prediction inaccuracies, allowing the model to enhance its predictive precision with each iteration.

Central to classifier training is the optimization process, which fine-tunes classifier's parameters to minimize prediction discrepancies. A sophisticated optimization technique may be the Adam optimizer. Leveraging the strengths of both AdaGrad and RMSProp, Adam calculates adaptive learning rates for each parameter by observing the first and second moments of the gradients. This dual consideration allows Adam to skillfully adjust model parameters, often achieving faster convergence and superior generalization. While the effectiveness of Adam is recognized, it is only one of a myriad of optimization algorithms available. The present disclosure does not intend to limit the scope as Adam only, and other optimization algorithms may be utilized too, such as Gradient Descent and its variants, Stochastic Gradient Descent, Adagrad, RMSprop, Momentum, and AdaDelta.

In one embodiment, a method for predicting user intentions within a digital banking application by using the trained classifier is disclosed. During each active engagement with the digital banking application, the system monitors user actions, capturing what is known as a "pathway dataset". Actions performed by the user within a current user session of the digital banking application are recorded. The capturing of the user's actions may be performed by a tracking service such as Google Analytics™ as discussed above. Each such action, referred to as a navigation event, encapsulates details with respect to the user's actions as discussed above. The term "pathway" indicates that the data from this dataset relates to the navigational operations prior to the user's final visit to the page or section to complete the intended transaction.

The pathway dataset may then be processed and transformed for user intention prediction. A predefined algorithm may be used to convert the raw sequence of navigation events into a series of latent space representations, each representing a particular navigation event. The conversion may be achieved by using a mechanism such as a look-up table or an encoder such as LabelEncoder from SCIKIT-LEARN™. In other words, each unique navigation event is mapped to or encoded to a specific code. This conversion not only ensures that the data is in a format compatible with the classifier, but also enhances the classifier's ability and processing speed to recognize patterns and make accurate predictions.

A pre-trained classifier is then used to perform the prediction. The classifier may be trained as described above to reflect the navigation patterns or behaviors of one or more users that lead to particular transactional actions of interest. As a sequence of converted latent space representations representing the navigation events of the current session are fed into the classifier, the classifier may then classify the navigation events into a predicted user intention. The predicted user intention may then be suggested to the user via a GUI of the digital banking application. For instance, a window may be displayed on the screen of the user's device (such as a mobile phone or laptop), displaying a question such as, "Would you like to transfer funds?" with a Yes/No selection. Upon the user selecting "Yes", the GUI can automatically navigate the user to the appropriate service for transferring funds. If "No" is selected, the window disappears, allowing the user to continue their current session uninterrupted. In some examples, each analysis may culminate in the classifier assigning confidence levels indicating the respective likelihoods of various user intentions.

To increase the likelihood that the classifier's predictions are accurate and that only the accurate predictions are presented to the end user, a confidence threshold may be set. In this scenario, only when the model's confidence level in a particular prediction exceeds this threshold will it mark that associated intention as a "predicted intention".

Referring to FIG. 1, there is shown a block diagram illustrating a system 100 tailored for predicting user intention within a digital banking application. This system 100 integrates a multi-functional computing service 110 that is adaptable to various platforms including, but not limited to, mobile phones, desktop computers, cloud-based servers, or any other computing entity suitable for predicting user intention.

Within the architecture of the computing service 110 are two primary modules: a main module 111 and an event prediction module 112. The main module 111 is a hub, equipped with or having connectivity to components such as a user interface (UI), an input/output (I/O) mechanism, a networking suite, and the basic infrastructure for running the digital banking application, as discussed above. This main module 111 is also the gateway for receiving inputs and interactions from an external user input module 120, ensuring seamless assimilation of real-time user interactions.

Linked to the main module 111 is an event prediction module 112, which implements the functionality of the prediction mechanism according to the embodiments described herein. Through bi-directional communication channels, these two modules 111, 112 work together to implement the prediction.

In addition, the main module 111 communicates with a tracking service module 130. As mentioned earlier, this module 130 monitors all user activities within the digital banking application. Every click, swipe, or tap made by the user may generate a dataset comprising a chronological sequence of navigation events. This meticulously captured data then finds its way into the event prediction module 112. Within the module 112, using the capabilities of the pre-trained classifier described earlier, these navigation events may undergo an analytical transformation. The system assesses, with significant precision, the likelihood that the user's actions in the current session fall within one of the pre-defined intentions of interest. For example, the predefined intentions of interest may include, at least, paying bills, transferring funds between accounts, and creating email money transfers.

The system 100 is an advantageous blend of user activity monitoring and advanced neural network predictive modeling. It converts real-time user interactions in digital banking applications into insightful predictive data, fostering a more tailored and intuitive banking interface that is attuned to user intention.

Advantageously, the design philosophy of the system 100 prioritizes user privacy and data integrity. Generating user intention predictions without accessing sensitive financial details not only demonstrates the system's 100 commitment to safeguarding user confidentiality but also highlights the possibility of accurate intent prediction without relying on sensitive financial data. This methodological approach can foster the trust users have in financial institutions and help create a secure and privacy-focused digital banking environment.

EXAMPLES

1. Dataset Preparation

The following descriptions are of experiments conducted by the inventors to validate and exemplify the effectiveness of the disclosed methods and systems. The results of these experiments emphasize the innovations presented herein. It is important to note, however, that these are merely illustrative examples and in no way limit the scope of the present disclosure. The embodiments and claims of this disclosure should not be construed as being strictly bound or limited by these experimental details.

In the example, the disclosed training process utilized historical navigation events from past user sessions, such as screen names, navigation events, and related interactions, with the primary goal of identifying recognizable patterns. These patterns, once identified, were intended to predict the likelihood that a user will perform one of three specific transactions of interest within the current user session: "Pay Bills", "Transfer Funds", and "Email Money Transfer". It should be understood that the three specific transactions are merely exemplary for this example, and other embodiments may employ different transactions, more transactions, or fewer transactions.

To facilitate a structured representation of these interactions, certain notations were defined. Specifically, $P_i$ represented the ith navigation event documented in the current user session. Consequently, $P_{i+1}$ designated the navigation event chronicled immediately subsequent to the ith navigation event.

Within this framework, S was characterized as a time-ordered sequence of navigation events, articulated as:

$$S = P_{n-k}, P_{n-(k-1)}, \cdots, P_{n-2}, P_{n-1}, P_n, P_{n+1} \mid n, k \in Z; k \leq n$$

where both n and k were integers belonging to the set of all integers Z, and the condition k≤n must hold true.

Here, $P_{n+1}$ unambiguously signified a navigation event that distinctly delineated the user intention to initiate one of the aforementioned transactions of interest. S represented a sequence of navigation events for one user or individual in one session. A training dataset then contained sequences of navigation events for multiple users, and there was at least one session for each user.

Subsequent to the assembly of sequence S, the training process underwent a transformation, rendering it into feature vectors. These vectors were used in the training phase of the classifier, facilitating enhanced accuracy in user intention recognition within the digital banking application. It should be understood that, for using the trained classifier to predict the user intention, a sequence of navigation events converted into latent space representations may adopt the form of feature vector as the input to the classifier.

As described above, the disclosed process utilized a sequence of navigation events, denoted as S, and the individual events, symbolized as P, that make up the aforementioned sequence. These events were synthesized as users interacted with a mobile banking application on platforms such as Android™ and iOS™. As users navigated and operated within this banking application, pertinent usage information was captured and recorded via an analytics platform such as Google Analytics™ in this case.

This analytics platform specialized in ingesting data that provided insight into the manner in which users maneuvered through the application. Such data included actions taken by users, events triggered during their interactions, and other navigation-related dynamics. This consolidated data formed the basis for an improved understanding of user behavior within the digital banking environment. Table 1 below illustrates an example captured by Google Analytics™.

TABLE 1

| Data captured from an example analytics platform and descriptions of the field names | | |
| --- | --- | --- |
| Field Name | Data Type | Description |
| date | STRING | The date when a specific action or event occurred in the app in YYYYMMDD format |
| Timestamp | INTEGER | The date and time when a specific action or event occurred in the digital banking application |
| fullVisitorId | STRING | The unique visitor ID |
| visitId | INTEGER | An identifier for this session. This is part of the value is usually stored as the utmb cookie. It is unique to the user. For a completely unique ID, a combination of fullVisitorId and visitId can be used. |
| screenName | STRING | The name or identifier of the app screen where the action or event took place |
| eventLabel | STRING | Additional details or labels related to the event |

To facilitate further processing and use of this accumulated data in model training, the data was exported into a format suitable for analytics, such as a comma separated values (CSV) format. This analytics-derived data was useful in training the intention prediction model. The model was designed with the goal of predicting the most likely future actions that the user might take, specifically targeting transaction types such as "Pay Bills", "Transfer Funds", and "E-Transfer" in this example.

By delving into user behavioral data, which included parameters such as screens visited by users, interactive elements engaged with, and events triggered, patterns and correlations were identified. These patterns correlated with certain transactional tendencies. An understanding of these user intentions enhanced the ability to refine the user interface, tailored application functionality, and offered customized services to the user base. Such a user-centric approach increased overall application engagement, facilitating greater user satisfaction and a more intuitive digital banking experience.

For the purposes of this disclosure, an "intent" or "intention" is defined as a specific action the user instructs using the user interface of the digital banking application. The user intention can be associated with a screen name (representing the nature of current user interface in the digital banking application) or a navigation event (such as the links/options/buttons the user chooses by clicking), which corresponds to a predetermined action that the digital banking application performs, such as a transaction of funds. In this example, a transaction of funds included "Pay Bills", "Transfer Funds", and "Email Money Transfer" as three types of user intentions. This distinctive event, which provides a clear indication of the user's transactional intention, is represented as $P_{n+1}$ in the sequence of navigation events.

To further illustrate this, an example spreadsheet as listed in Table 2 provides an example representation of a user intention to perform a "Transfer Money" transaction. The depiction in Table 2 helps to convey the concept of user intention in the context of the digital banking application.

TABLE 2

| | Example spreadsheet listing multiple lines of navigation events | | | | | |
|---|---|---|---|---|---|---|
| Row No. | concatId | timestamp | fullVisitorId | visitId | screenName | eventLabel |
| 1 | 1.00000010757893E+29 | 2023-03-01 7:41 | 10000001075789300000 | 1677674501 | | MFA - Track - Secure Device Sign In - Completed Successful |
| 2 | 1.00000010757893E+29 | 2023-03-01 7:41 | 10000001075789300000 | 1677674501 | | Sign In - Tap - Password Sign In Remember Me - On |
| 3 | 1.00000010757893E+29 | 2023-03-01 7:41 | 10000001075789300000 | 1677674501 | | Custom Dimension Capture - Client Type - Personal |
| 4 | 1.00000010757893E+29 | 2023-03-01 7:41 | 10000001075789300000 | 1677674501 | | Custom Dimension Capture - Client Cohort - D |
| 5 | 1.00000010757893E+29 | 2023-03-01 7:41 | 10000001075789300000 | 1677674501 | | Client Type - Capture - Client Account Type |
| 6 | 1.00000010757893E+29 | 2023-03-01 7:41 | 10000001075789300000 | 1677674501 | | Custom Dimension Capture - App Variation - Standard |
| 7 | 1.00000010757893E+29 | 2023-03-01 7:41 | 10000001075789300000 | 1677674501 | Dashboard | |
| 8 | 1.00000010757893E+29 | 2023-03-01 7:41 | 10000001075789300000 | 1677674501 | | NOMI - View - Budget Carousel - Collapsed |
| 9 | 1.00000010757893E+29 | 2023-03-01 7:41 | 10000001075789300000 | 1677674501 | | Capture - Dashboard - Find & Save Tile Fails to Load |
| 10 | 1.00000010757893E+29 | 2023-03-01 7:41 | 10000001075789300000 | 1677674501 | Account Details - Chequing | |
| 11 | 1.00000010757893E+29 | 2023-03-01 7:41 | 10000001075789300000 | 1677674501 | | Dashboard - Tap Account - Chequing |
| 12 | 1.00000010757893E+29 | 2023-03-01 7:41 | 10000001075789300000 | 1677674501 | | Ad Type: Salesforce Mobile - DDA Contextual Notices - impression - DDA_ONBOARDING_SF |
| 13 | 1.00000010757893E+29 | 2023-03-01 7:41 | 10000001075789300000 | 1677674501 | | |
| 14 | 1.00000010757893E+29 | 2023-03-01 7:42 | 10000001075789300000 | 1677674501 | | Tab Bar - Tap - Accounts |
| 15 | 1.00000010757893E+29 | 2023-03-01 7:42 | 10000001075789300000 | 1677674501 | Accounts | |
| 16 | 1.00000010757893E+29 | 2023-03-01 7:42 | 10000001075789300000 | 1677674501 | | Tab Bar - Tap Action Button - Transfer Between My Accounts |
| 17 | 1.00000010757893E+29 | 2023-03-01 7:42 | 10000001075789300000 | 1677674501 | Transfer Funds - New | |
| 18 | 1.00000010757893E+29 | 2023-03-01 7:42 | 10000001075789300000 | 1677674501 | | Move Money - Tap - Transfer Funds - New - From Account Selected |
| 19 | 1.00000010757893E+29 | 2023-03-01 7:42 | 10000001075789300000 | 1677674501 | | Move Money - Tap - Transfer Funds - New - To Account Selected |
| 20 | 1.00000010757893E+29 | 2023-03-01 7:42 | 10000001075789300000 | 1677674501 | | Move Money - Tap - Transfer Funds - New - Amount Selected |
| 21 | 1.00000010757893E+29 | 2023-03-01 7:42 | 10000001075789300000 | 1677674501 | Transfer Funds - Ready to Send | |
| 22 | 1.00000010757893E+29 | 2023-03-01 7:42 | 10000001075789300000 | 1677674501 | | Move Money - Tap - Create One Time Same Day Transfer (Attempt) |
| 23 | 1.00000010757893E+29 | 2023-03-01 7:42 | 10000001075789300000 | 1677674501 | | Move Money - Tap - Create One Time Same Day Transfer (Success) |
| 24 | 1.00000010757893E+29 | 2023-03-01 7:42 | 10000001075789300000 | 1677674501 | Transfer Funds - Completed - Successful | |
| 25 | 1.00000010757893E+29 | 2023-03-01 7:42 | 10000001075789300000 | 1677674501 | Accounts | |

TABLE 2-continued

Example spreadsheet listing multiple lines of navigation events

| Row No. | concatId | timestamp | fullVisitorId | visitId | screenName | eventLabel |
|---|---|---|---|---|---|---|
| 26 | 1.00000010757893E+29 | 2023-03-01 7:42 | 10000001075789300000 | 1677674501 | Transfer Funds - New | |
| 27 | 1.00000010757893E+29 | 2023-03-01 7:43 | 10000001075789300000 | 1677674501 | | Tab Bar - Tap Action Button - Pay a Bill |
| 28 | 1.00000010757893E+29 | 2023-03-01 7:43 | 10000001075789300000 | 1677674501 | | Pay Bills - View - Carousel - Frequently Paid |
| 29 | 1.00000010757893E+29 | 2023-03-01 7:43 | 10000001075789300000 | 1677674501 | Pay Bill Options | |
| 30 | 1.00000010757893E+29 | 2023-03-01 7:43 | 10000001075789300000 | 1677674501 | | Pay Bills - Tap - Existing Payees - Frequently Paid |
| 31 | 1.00000010757893E+29 | 2023-03-01 7:43 | 10000001075789300000 | 1677674501 | Pay Bills New - Pay Existing Payee | |
| 32 | 1.00000010757893E+29 | 2023-03-01 7:43 | 10000001075789300000 | 1677674501 | | Move Money - Tap - Pay Bills New - Pay Existing Payee - Amount Selected |
| 33 | 1.00000010757893E+29 | 2023-03-01 7:43 | 10000001075789300000 | 1677674501 | | Move Money - Tap - Pay Bills New - Pay Existing Payee - From Account Selected |
| 34 | 1.00000010757893E+29 | 2023-03-01 7:43 | 10000001075789300000 | 1677674501 | Pay Bills - Ready to Send | |
| 35 | 1.00000010757893E+29 | 2023-03-01 7:43 | 10000001075789300000 | 1677674501 | | Move Money - Tap - Create One Time Same Day Bill Payment (Attempt) |
| 36 | 1.00000010757893E+29 | 2023-03-01 7:43 | 10000001075789300000 | 1677674501 | | Pay Bills - Completed - View - Cancellable Bill |
| 37 | 1.00000010757893E+29 | 2023-03-01 7:43 | 10000001075789300000 | 1677674501 | | Move Money - Tap - Create One Time Same Day Bill Payment (Success) |
| 38 | 1.00000010757893E+29 | 2023-03-01 7:43 | 10000001075789300000 | 1677674501 | Pay Bills - Completed - Successful | |
| 39 | 1.00000010757893E+29 | 2023-03-01 7:43 | 10000001075789300000 | 1677674501 | | Pay Bills - View - Carousel - Frequently Paid |
| 40 | 1.00000010757893E+29 | 2023-03-01 7:43 | 10000001075789300000 | 1677674501 | Pay Bill Options | |
| 41 | 1.00000010757893E+29 | 2023-03-01 7:43 | 10000001075789300000 | 1677674501 | | Pay Bills - Tap - Existing Payees - Frequently Paid |
| 42 | 1.00000010757893E+29 | 2023-03-01 7:43 | 10000001075789300000 | 1677674501 | Pay Bills New - Pay Existing Payee | |
| 43 | 1.00000010757893E+29 | 2023-03-01 7:43 | 10000001075789300000 | 1677674501 | | Move Money - Tap - Pay Bills New - Pay Existing Payee - From Account Selected |
| 44 | 1.00000010757893E+29 | 2023-03-01 7:43 | 10000001075789300000 | 1677674501 | | Move Money - Tap - Pay Bills New - Pay Existing Payee - Amount Selected |
| 45 | 1.00000010757893E+29 | 2023-03-01 7:43 | 10000001075789300000 | 1677674501 | Pay Bills - Ready to Send | |
| 46 | 1.00000010757893E+29 | 2023-03-01 7:43 | 10000001075789300000 | 1677674501 | | Move Money - Tap - Create One Time Same Day Bill Payment (Attempt) |
| 47 | 1.00000010757893E+29 | 2023-03-01 7:43 | 10000001075789300000 | 1677674501 | | Pay Bills - Completed - View - Cancellable Bill |
| 48 | 1.00000010757893E+29 | 2023-03-01 7:43 | 10000001075789300000 | 1677674501 | Pay Bills - Completed - Successful | |

As shown, the first user intention belonging to one of the predetermined types of user intentions is the transfer of funds, which can be associated with the screen name "Transfer Funds-New" (row number 17) and/or the navigation event of the first instance of "Move Money" (row number 18), and the navigation events preceding the row(s) associated with the user intention are the "pathway". The mechanics and algorithmic intricacies underlying the identification of navigation events that are consistent with a user intention will be explained in later parts of this description. This methodological breakdown provided a granular insight into the systematic approach used to locate and interpret these navigation events, ensuring that the digital banking application remains anticipatory and responsive to user needs.

For the purpose of the present disclosure, the term "pathway" may be characterized as a sequential arrangement of navigation events and/or identities of a screen of the GUI (screen names) that culminate just before the event that unmistakably denotes the user intention. Explicitly, a pathway is constituted by sequence $P_{n-k}$, $P_{n-(k-1)}$, . . . , $P_{n-2}$, $P_{n-1}$, $P_n$, and then $P_{n+1}$ symbolizes the aforementioned intention.

In this example, the dataset derived from the analytics platform did not distinguish between screen names and navigation events, where screen names refers to the present-ment or "impression" of a particular page of the app to the user, and navigation events refers to a specific action the user is taking which results in the transition of a screen to another screen (for example, clicking a NEXT button on a screen). As a result, for example, two specific columns, referred to as "screenname" and "eventLabel", were integrated into a unified column named "screenName/eventLabel". This synthesis helped ensure a consolidated representation of user interactions, which further facilitated the data processing and interpretation stages.

A "pathway" reflects the procedural journey users took before arriving at certain transactions or intentions within the digital banking application. Recognizing that a variety of navigational paths may culminate in the same user intention, the pathway, enriched by its sequential steps, provided insight into the recurring operational choices of users that lead to specific intentions.

Such ingrained pathways were beneficial for the transaction prediction model during its learning phase. When deployed in a live operational setting, a previously trained model was equipped to compare a user's real-time sequence of actions against the catalog of learned pathways. By recognizing analogous patterns, the model was capable of inferring the prospective intent underlying the user's actions. This capability solidified the model's ability to provide accurate predictions of user intentions, thereby enhancing the user experience within the application.

2. Training

In this example, the generation of feature vectors for model training was closely linked to the identification of the pathway leading to one of the three predefined intentions of interest. As part of the data refinement process, irrelevant columns were eliminated from the analysis dataset. Thus, the processed dataset primarily retained columns labeled "screenName/eventLabel" and "intention". The dataset also contained an optional "fullVisitorId".

Segmentation of the dataset was performed based on the unique values encapsulated in the "fullVisitorId" column, which demarcated individual user sessions. Within these demarcated user sessions, the methodology adopted a strategic approach: starting from the first discernible user intention (where the user intention was any valid value), the pathway leading to that moment was retraced. In this example, the traced pathway was designed with an upper limit on its length of 50 events. It should be understood, however, that other numbers of events may also be feasible, such as any integer selected from a range of 30 to 70 events. If the length is lower than 30, details about the pathway may be sacrificed; if the length is longer than 70, convergence time during training may be adversely affected.

For the identified pathways having a length not reaching the 50 event threshold, padding techniques were used to ensure that the length of the pathway was increased to the required 50 events. Following this length assurance, label encoding was applied to the screenName/eventLabel values. This encoding process served to transform the original string values into a series of latent space representations, thereby providing a form that was more amenable to machine learning processes. An example encoder used was the LabelEncoder from SCIKIT-LEARN™ for transforming non-numerical labels (strings) to numerical representations.

To finalize the feature vector for training, the "intention" value was prepended, resulting in a holistic feature vector with a dimensionality of 51. For visual clarification, two representative examples of such feature vectors are provided as:

['TRANSFER_FUNDS',[178, 1916, 1925, 1931, 1066, 439, 1937, 1766, 478, 561, 569, 566, 561, 1936, 1308, 752, 384, 752, 384, 2033, 1098, 2059, 2177, 1194, 1197, 1196, 1193, 1195, 2178, 1140, 1141, 2173, 752, 308, 384, 384, 1322, 779, 18, 752, 384, 384, 799, 48, 45, 752, 384, 384, 2065, 2106]],
as vectorized from:
['TRANSFER_FUNDS', ['Sign In—Scroll—Client Lobby', 'Sign In', 'Sign In—Tap—Mobile Banking', 'Client Lobby—Tap—Sign In', 'Sign In—Tap—Touch ID Sign In Automatically—Attempt [Mobile Banking]', 'Sign In Fix—Tap—Touch ID Sign In Automatically—Attempt [Mobile Banking]', 'Client Accessibility—Track—Voice Over Off', 'Sign In—Tap—Password Sign In Remember Me—On', 'Push Notification—Track—Notification On', 'Client Type—Capture—Client Account Type', 'Custom Dimension Capture—App Variation—Standard', 'Custom Dimension Capture—Client Type—Personal', 'Custom Dimension Capture—Client Cohort—D (Aged 22 or older)', 'Custom Dimension Capture—App Variation—Standard', 'Sign In—Tap—Touch ID Sign In Automatically—Success [Mobile Banking]', 'Sign In Fix—Tap—Touch ID Sign In Automatically Success [Mobile Banking]', 'Sign In Fix—Capture—Token Updated—Access', 'Sign In Fix—Capture—Token Updated—Refresh', 'Dashboard—Personal—Linked State', 'Dashboard—View—NOMI Find & Save', 'Dashboard—Tap—View All', 'Accounts Summary—Personal—Linked State', 'Accounts—Tap Account—Chequing', 'Account Details—Chequing', 'Tab Bar—Tap Action Button Transfer Between My Accounts']];
and
['E_TRANSFER',[9000, 9000, 9000, 9000, 9000, 9000, 9000, 9000, 9000, 9000, 9000, 9000, 9000, 9000, 9000, 9000, 9000, 9000, 9000, 9000, 9000, 9000, 9000, 9000, 9000, 9000, 9000, 442, 181, 179, 1916, 925, 1945, 1976, 439, 1938, 1766, 478, 561, 569, 566, 561, 1950, 1979, 752, 1308, 810, 2034, 1126, 1165]],
as vectorized from:
['E_TRANSFER', ['Sign In', 'Sign In—Tap—Mobile Banking', 'Ad Type: Salesforce Mobile—Client Lobby Upper—impression—Campaign', 'Ad Type: Salesforce Mobile—Client Lobby Lower—impression—Feature', 'Sign In—Tap—Touch ID Sign In Automatically—Failure Input Not Recognized [Mobile Banking]', 'Sign In—Tap—Touch ID Sign In Automatically—Attempt [Mobile Banking]', 'Sign In Fix—Tap—Touch ID Sign In Automatically—Attempt [Mobile Banking]', 'Sign In—Tap—Touch ID Sign In Automatically—Failure Input Not Recognized [Mobile Banking]', 'Sign In—Tap—Touch ID Sign In Automatically—Attempt [Mobile Banking]', 'Sign In Fix—Tap—Touch ID Sign In Automatically—Attempt [Mobile Banking]', 'Sign In—Tap—Touch ID Sign In Automatically—Attempt [Mobile Banking]', 'Sign In Fix—Tap—Touch ID Sign In Automatically—Attempt [Mobile Banking]', 'Client Accessibility—Track—Voice Over Off', 'Sign In—Tap—Password Sign In Remember Me—On', 'Push Notification—Track—Notification On', 'Client Type Capture—Client Account Type', 'Custom Dimension Capture—App Variation—Standard', 'Custom Dimension Capture—Client Type—Personal', 'Custom Dimension Capture—Client Cohort D (Aged 22 or older)', 'Custom Dimension Capture—App Variation—Standard', 'Sign In—Tap—Touch ID Sign In Automatically—Success [Mobile Banking]', 'Sign In Fix—Tap—Touch ID Sign In Automatically—Success [Mobile Banking]', 'Dashboard', 'Capture—Dashboard—Find & Save Tile Fails to Load', 'NOMI—View—Budget Carousel—Collapsed']].

Although the two examples above demonstrated the conversion of navigation events into numerical representations, other forms of encoding may also be used, such as characters, or a combination of numerals and characters.

Furthermore, the vectorization process was performed by example code excerpts below, where the implementation was coded in a programming language such as Python™ in this case.

```
import pandas
df = pandas.read_csv('Combined_Dataset.csv')
# combine column screenname with eventLabel
df['screenName/eventLabel'] = df.apply(lambda row: row['screenName'] + row['eventLabel'],
axis=1)
# add a column "intention" to df
df['intention'] = "
user_journeys=[ ]
def findUserIntentions(user_id):
    user_pathway = [ ]
    #df_user is a DataFrame that includes all rows
    df_user = pandas.DataFrame(df[df["fullVisitorId"] == user_id])
    for i in df_user.index:
        # Add the current event label or screen name to the user_pathway list
        user_pathway.append(df_user["ScreenName/Event"][i])
        # If intention cell is in ["PAY_BILLS", "TRANSFER_FUNDS", "E_TRANSFER"]
        if df_user['intention'][i] in ["PAY_BILLS", "TRANSFER_FUNDS", "E_TRANSFER"]:
            current_intention = df_user['intention'][i]
            # Get the last 50 events
            padded_pathway = user_pathway[-50:]
            # Pad with 9000 if needed
            while len(padded_pathway) < 50:
                padded_pathway.insert(0, 9000)
            new_journey = [current_intention, padded_pathway]
            user_journeys.append(new_journey)
# Extract unique 'fullVisitorId' values from df into users
users = pandas.Series(df['fullVisitorId'].unique( ))
labels_to_intention_multiple_users = { }
# for each unique user, call findUserIntentions to build feature vector of [intention,
pathway]
for user_id in users:
    findUserIntentions(user_id)
```

As described above, the dataset under discussion was extended by an additional column referred to as "intention". This designated column took one of three specific values in this example, namely: {Pay Bills, Transfer Funds, E-Transfer}. During training, this "intention" column served as ground truth for the dataset, which may be annotated by a human, representing the correct output that the classifier was trained to predict.

The populating strategy for the "intention" column was guided by the data residing in at least one of two main columns of the dataset: "screenName" and "eventLabel". For example, a user activated the application and initiated the process of paying bills. This navigation culminated with their arrival at the Pay Bills interface, a key event registered in the "screenName" column. To translate this navigation event into a clear user intention, the process searched the "screenName" column. The search was intended to identify specific lexemes or keywords, such as "pay bills", or other distinguishing features inherent to the "pay bills" operation. Upon successful identification, the "intention" column of the corresponding row was updated with the unique label "PAY BILLS". Analogous mechanisms were orchestrated for the remaining intention fields, ensuring that each row in the "intention" column was annotated with one of three unique intention labels: {PAY BILLS, TRANSFER FUNDS, E-TRANSFER}.

Moving on to the prediction phase, the process employed a window-based technique. Specifically, a window was extracted comprising 50 antecedent rows with respect to a uniquely labeled row. This extracted data ensemble served as the input feature cluster for the prediction model, enabling the model to predict the user's impending intention. The depiction in Table 3 helps to convey the concept of the window with a predetermined number of rows (in this case, 50).

TABLE 3

| Example spreadsheet listing 50 rows of data preceding the "TRANSFER_FUNDS" label | | | | |
|---|---|---|---|---|
| timestamp | fullVisitorId | screenName | eventLabel | intention |
| 2023-03-01 19:43 | 10001645622403200000 | DI - Activity | | |
| 2023-03-01 19:43 | 10001645622403200000 | DI - Holdings | | |
| 2023-03-01 19:43 | 10001645622403200000 | DI - Dashboard | | |
| 2023-03-01 19:43 | 10001645622403200000 | DI - Contact Us | | |
| 2023-03-01 19:43 | 10001645622403200000 | DI - Dashboard | | |
| 2023-03-01 13:45 | 10001649408294700000 | | | |
| 2023-03-01 13:45 | 10001649408294700000 | | Ad Type: Salesforce Mobile - Client Lobby Lower - impression - New Feature | |
| 2023-03-01 13:45 | 10001649408294700000 | | | |
| 2023-03-01 13:45 | 10001649408294700000 | | Sign In - Tap - Mobile Banking | |
| 2023-03-01 13:45 | 10001649408294700000 | | Client Lobby - Tap - Sign In | |
| 2023-03-01 13:45 | 10001649408294700000 | | Ad Type: Salesforce Mobile - Client Lobby Upper - impression - Campaign | |
| 2023-03-01 13:45 | 10001649408294700000 | Sign In | | |
| 2023-03-01 13:45 | 10001649408294700000 | | Sign In - Tap - Password Sign In - Attempt [Mobile Banking] | |
| 2023-03-01 13:45 | 10001649408294700000 | | Client Type - Capture - Client Account Type | |
| 2023-03-01 13:45 | 10001649408294700000 | | Sign In - Tap - Password Sign In - Success [Mobile Banking] | |
| 2023-03-01 13:45 | 10001649408294700000 | | Custom Dimension Capture - Client Cohort - D | |
| 2023-03-01 13:45 | 10001649408294700000 | | Custom Dimension Capture - Client Type - Personal | |
| 2023-03-01 13:45 | 10001649408294700000 | | Custom Dimension Capture - App Variation - Standard | |
| 2023-03-01 13:45 | 10001649408294700000 | | Client Accessibility - Track - Voice Over Off | |
| 2023-03-01 13:45 | 10001649408294700000 | | Custom Dimension Capture - App Variation - Standard | |
| 2023-03-01 13:45 | 10001649408294700000 | | Push Notification - Track - Notification On | |
| 2023-03-01 13:45 | 10001649408294700000 | | MFA - Track - Secure Device Sign In - Completed Successful | |
| 2023-03-01 13:45 | 10001649408294700000 | | Sign In - Tap - Password Sign In Remember Me - On | |
| 2023-03-01 13:45 | 10001649408294700000 | | Capture - Dashboard - Find & Save Tile Fails to Load | |
| 2023-03-01 13:45 | 10001649408294700000 | Dashboard | | |
| 2023-03-01 13:45 | 10001649408294700000 | | Tab Bar - Tap Action Button - Deposit a Cheque | |
| 2023-03-01 13:45 | 10001649408294700000 | Deposit Cheque | | |
| 2023-03-01 13:45 | 10001649408294700000 | Mitek Document Capture | | |
| 2023-03-01 13:45 | 10001649408294700000 | Mitek Document Capture | | |
| 2023-03-01 13:45 | 10001649408294700000 | | Cheque Deposit - Tap - Capture Photo Again (Front of Cheque) | |
| 2023-03-01 13:45 | 10001649408294700000 | | Cheque Deposit - Tap - Use Photo (Front of Cheque) | |
| 2023-03-01 13:45 | 10001649408294700000 | Deposit Cheque | | |

TABLE 3-continued

| Example spreadsheet listing 50 rows of data preceding the "TRANSFER_FUNDS" label | | | | |
| --- | --- | --- | --- | --- |
| timestamp | fullVisitorId | screenName | eventLabel | intention |
| 2023-03-01 13:45 | 10001649408294700000 | Deposit Cheque | | |
| 2023-03-01 13:45 | 10001649408294700000 | Deposit Cheque | | |
| 2023-03-01 13:45 | 10001649408294700000 | Deposit Cheque | | |
| 2023-03-01 13:45 | 10001649408294700000 | Mitek Document Capture | | |
| 2023-03-01 13:45 | 10001649408294700000 | Mitek Document Capture | | |
| 2023-03-01 13:46 | 10001649408294700000 | Deposit Cheque | | |
| 2023-03-01 13:46 | 10001649408294700000 | Deposit Cheque | | |
| 2023-03-01 13:46 | 10001649408294700000 | | Cheque Deposit - Tap - Use Photo (Back of Cheque) | |
| 2023-03-01 13:46 | 10001649408294700000 | Deposit Cheque | | |
| 2023-03-01 13:46 | 10001649408294700000 | Deposit Cheque | | |
| 2023-03-01 13:46 | 10001649408294700000 | Deposit Cheque - Ready to Deposit | | |
| 2023-03-01 13:46 | 10001649408294700000 | Deposit Cheque - Completed - Successful | | |
| 2023-03-01 13:47 | 10001649408294700000 | Dashboard | | |
| 2023-03-01 13:47 | 10001649408294700000 | | Capture - Dashboard - Find & Save Tile Fails to Load | |
| 2023-03-01 13:47 | 10001649408294700000 | | Capture - Dashboard - Find & Save Tile Fails to Load | |
| 2023-03-01 13:48 | 10001649408294700000 | Dashboard | | |
| 2023-03-01 13:48 | 10001649408294700000 | | Capture - Dashboard - Find & Save Tile Fails to Load | |
| 2023-03-01 13:48 | 10001649408294700000 | | Capture - Dashboard - Find & Save Tile Fails to Load | |
| 2023-03-01 13:48 | 10001649408294700000 | | Tab Bar - Tap Action Button - Transfer Between My Accounts | TRANSFER_FUNDS |

In some situations, the originally obtained dataset exhibited a characteristic of class imbalance. For example, the number of events categorized as "pay bills" was significantly lower than the number of events categorized as "e-transfer" or "transfer funds". Such disparities in event distribution potentially skewed the performance of predictive models, causing them to be biased toward the majority class and neglect the nuances of the underrepresented class.

To address this imbalance and ensure equitable representation of all categories, the process according to the present disclosure employed an additional oversampling step to increase the representation of the minority class. The overall goal was to harmonize the event distribution, thereby bringing the minority class count closer to the majority class count. By employing this method, the dataset effectively became more balanced, ensuring that each class was given due consideration during the training phase of the predictive model.

In this example, the use of oversampling not only increased the robustness of the dataset, but also optimized the predictive ability of the model. By ensuring that each class, regardless of its initial representation, was equally considered, the system facilitated more accurate and holistic user intention prediction, reducing potential bias and ensuring more generalized model performance across diverse user interactions.

For the purpose of model development and subsequent evaluation, the dataset was systematically divided according to an 80-20 split. Specifically, 80% of the data was allocated to the training phase, while the remaining 20% was reserved for model testing and validation. Such a partitioning method ensured a comprehensive training phase while retaining a substantial portion of the data for unbiased performance evaluation.

Figure 2:
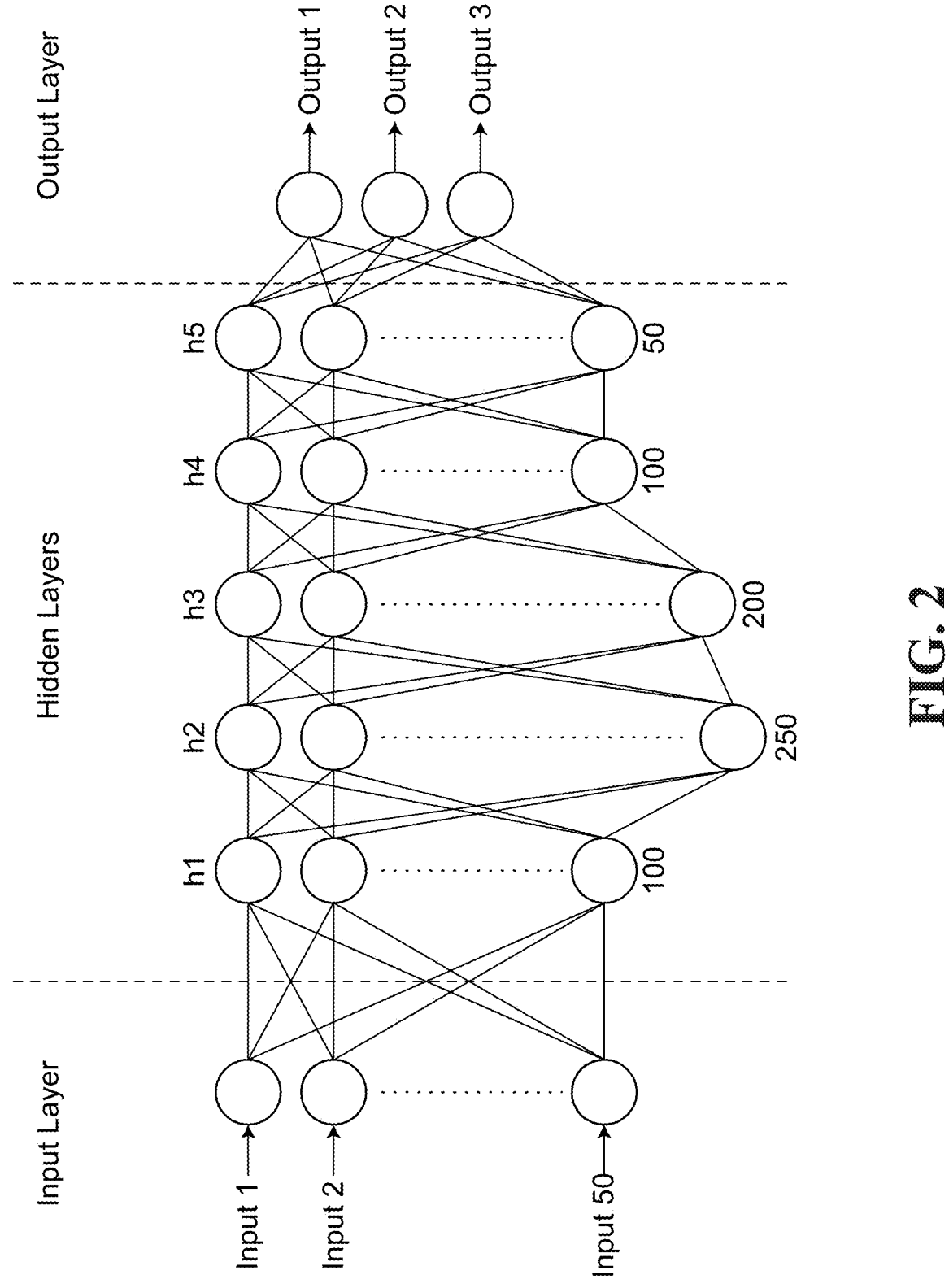
FIG. 2 depicts an example neural network architecture, according to an example embodiment.

As illustrated by FIG. 2, the neural network design used included five hidden layers. The configuration of neurons within these layers followed a sequential order: 100, 250, 200, 100, and 50, respectively. The final output layer was equipped with three neurons tailored to the three different transaction intentions. Determining the number of neurons for each layer was a material consideration. A design characterized by a paucity of neurons may fail to capture complex data patterns, a phenomenon commonly referred to as "underfitting". In contrast, a network saturated with an overabundance of neurons may introduce unwarranted complexity, rendering the model susceptible to "overfitting", where it becomes overly tuned to the training data and loses its ability to generalize.

With these principles in mind, a careful and iterative experimental process was undertaken to calibrate the model architecture. This systematic exploration aimed to balance the model's complexity with its ability to represent the data. To fine-tune the model's performance, the "Adam" optimizer was integrated into the training process. The training duration was determined by the number of epochs, which was varied in different experimental settings, including ranges from 30 to 70, 35 to 65, 40 to 60, 45 to 55, or precisely 50 epochs. Through experimentation, it was ascertained that the epoch ranges from 30 to 70 were all viable. However, it was observed that a span of 50 epochs yielded favorable accuracy. The decision to adopt this particular configuration was neither arbitrary nor instantaneous. It came about after rigorous hyperparameter optimization sessions coupled with repeated experiments. The chosen setup showed a propensity to consistently outperform alternative configurations, justifying its adoption as the primary architecture for intention prediction. The configurations for the above example were exemplified by the following example code.

```
import tensorflow as tf
os.environ['TF_CPP_MIN_LOG_LEVEL'] = '2'
model = Sequential( )
model.add(Dense(50, activation = "relu"))
model add(Dense(100, activation = "relu"))
model.add(Dense(250, activation = "relu"))
model.add(Dense(200, activation = "relu"))
model.add(Dense(100, activation="relu"))
model.add(Dense(50, activation="relu"))
model.add(Dense(3,  activation="softmax"))
model.compile(loss='sparse_categorical_crossentropy',
optimizer='adam', metrics=['accuracy'])
model.fit(X_train, y_train, validation_split=0.10 , epochs=50,
class_weight=class_weights)
```

Figure 3:
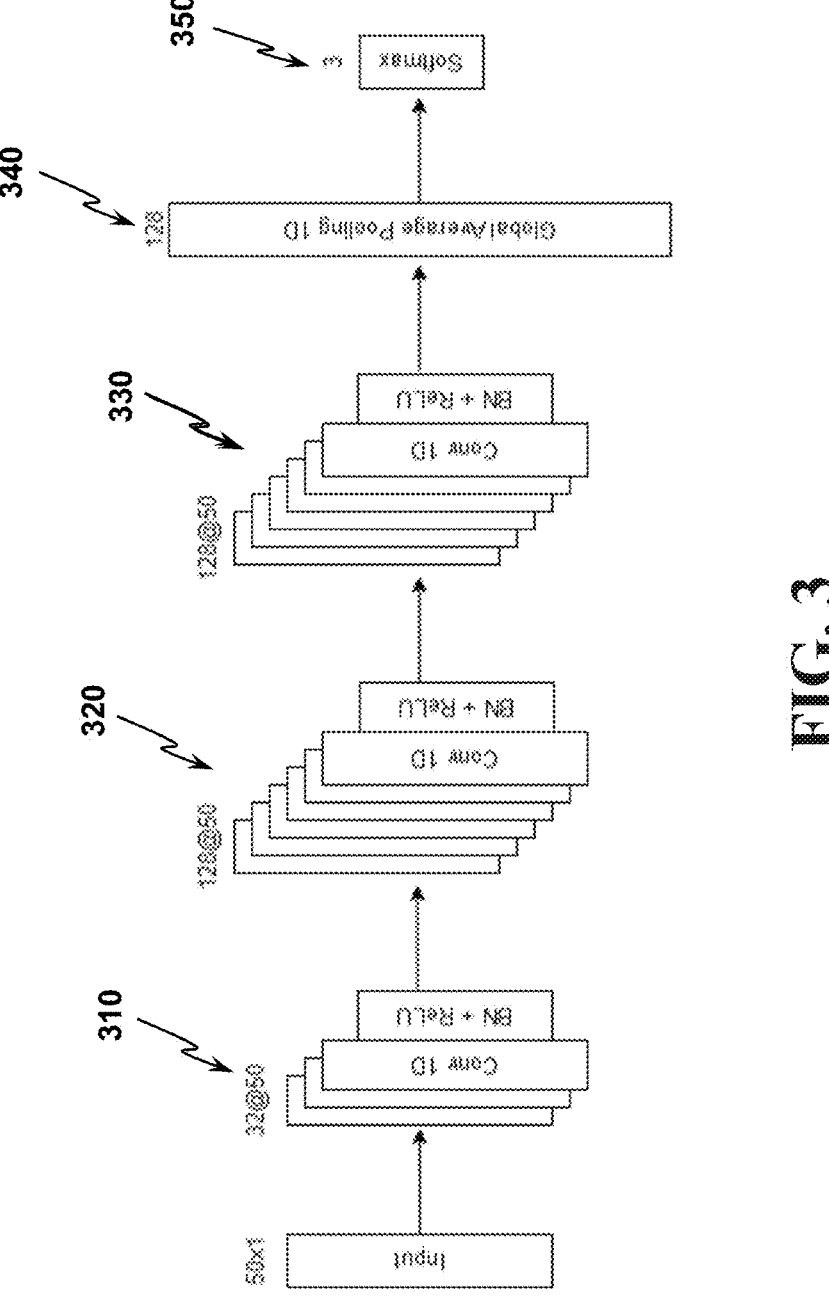
FIG. 3 depicts an example convolutional neural network, according to an example embodiment.

An alternative model architecture that leverages 1-dimensional convolution layers may also be used. It is recognized that the event pathway is in essence a time series, and when performing classification of a time series, it is advantageous to preserve invariance in the time dimension. Convolution has proven useful when the model needs invariance in spatial dimensions. If time is viewed as a dimension, the convolution filters learned allows to extract temporally invariant features which improves the performance of the model. In an example CNN model shown in FIG. 3, three 1-dimensional convolution layers 310, 320, 330 are used. The three convolution layers 310, 320, 330 contain 32 filters, 128 filters and 128 filters, respectively. Further, the kernel sizes of the convolution layers 310, 320, 330 are configured to be 3, 5, and 5, respectively. A drop-out layer is added after each convolution layer to minimize overtraining. The last convolution layer 330 feeds into a 1 dimensional global average pooling layer 340 before the output layer with a soft-max function 350. The model configuration can be exemplified by the following code snippet.

```
import tensorflow as tf
os.environ['TF_CPP_MIN_LOG_LEVEL'] = '2'
model = Sequential( )
# 1st Convolution layer
model.add(Conv1D(filters=32, kernel_size=3, input_shape=(50,1),
padding='same'))
model.add(BatchNormalization( ))
model.add(Activation('relu'))
model.add(Dropout(0.2))
model.add(Conv1D(filters=128, kernel_size=5, padding='same'))
model.add(BatchNormalization( ))
model.add(Activation('relu'))
model.add(Dropout(0.1))
model.add(Conv1D(filters=128, kernel_size=3, padding='same'))
model.add(BatchNormalization( ))
model.add(Activation('relu'))
model.add(Dropout(0.1))
model.add(GlobalAveragePooling1D( ))
model.add(Dense(3, activation="softmax"))
```

However, it should be understood that other numbers of epochs, different optimizer choices, or alternative neural network configurations are feasible. The setup presented is by no means an exhaustive representation of all possible architectures or hyperparameter combinations. Rather, it represents an instantiation that has proven effective given the specific dataset and goals of this endeavor. Other datasets, use cases, or shifts in goals may require re-evaluation and potential modification of the current architecture and training scheme.

3. Experimental Results

In the early stages of the research effort, a variety of modeling methods were explored, most notably decision trees and support vector machines. However, despite rigorous investigation and fine-tuning, these models achieved an average accuracy of only 50%, well below the target range of 65-75%. For a detailed review of these accuracy results, reference is made to Tables 4 and 5.

Two key metrics used to evaluate model performance in this study were precision and recall. Precision is defined as the proportion of true positive predictions relative to the sum of true positive and false positive predictions. Mathematically, it represents the proportion of correctly identified positive instances out of all instances predicted to be positive. In practice, precision provides insight into the model's ability to avoid false positive predictions by indicating the percentage of model predictions that are actually correct.

On the other hand, recall, often referred to as true positive rate or sensitivity, measures the proportion of true positive predictions relative to the sum of true positive and false negative predictions. In essence, recall quantifies the model's ability to identify all potential positive instances. It shows the extent to which the model can generate correct predictions from the entire pool of actual positive cases. A model with high recall is adept at capturing the majority of actual positive cases, with fewer instances slipping through the cracks as false negatives.

TABLE 4

| Results of Decision Tree Model | | |
| --- | --- | --- |
|  | Precision | Recall |
| Pay Bills | 0.29 | 0.23 |
| Transfer Funds | 0.71 | 0.66 |
| E Transfer | 0.58 | 0.68 |

TABLE 5

| Results of Support Vector Machine | | |
| --- | --- | --- |
|  | Precision | Recall |
| Pay Bills | 0.41 | 0.03 |
| Transfer Funds | 0.61 | 0.61 |
| E Transfer | 0.57 | 0.72 |

Given these suboptimal results, a systematic strategy was formulated to address these limitations. The first step was an intensive hyperparameter optimization of all models. However, even after numerous experimental configurations, the desired accuracy range remained elusive. This empirical evidence necessitated a change in modeling approach, leading to the introduction and exploration of neural networks. This choice was driven by the observed lack of correlation among the input features, making neural networks a promising candidate.

After moving to the neural network framework, initial empirical results mirrored previous models, settling at an average accuracy of 50%. Nevertheless, the research continued with optimization efforts, with an increased focus on meticulously fine-tuning the neural network's hyperparameters. This meticulous, iterative process was characterized by extensive validation and refinement. As a testament to this hyperparameter optimization, the feedforward neural network model achieved the ambitious target accuracy of approximately 70%. This achievement was not instantaneous; it was the result of exploring various hyperparameter combinations, including exploring epochs ranging from 20 to 50.

Figure 4:
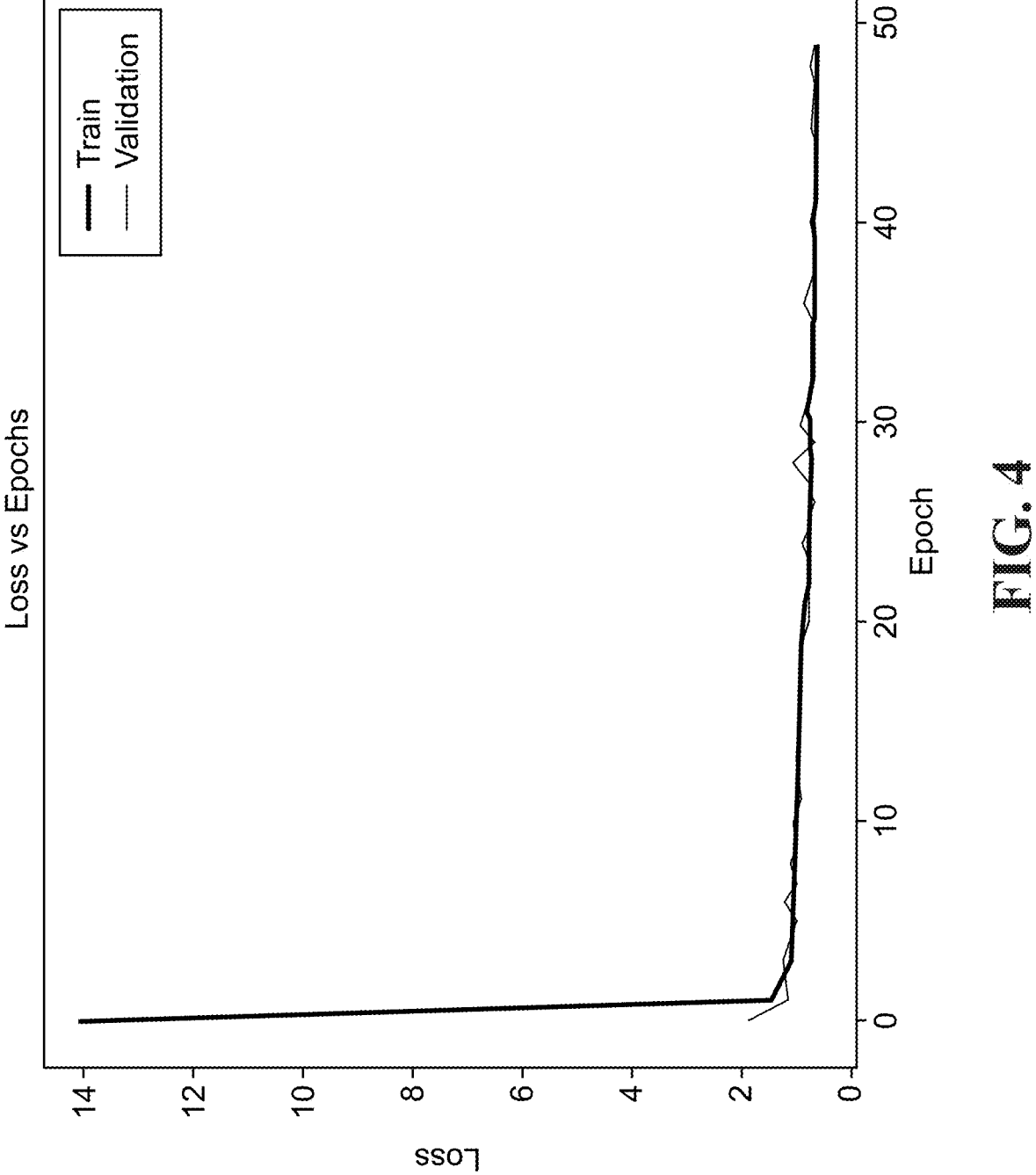
FIG. 4 depicts a plotted training and validation loss graph generated using data acquired during hyperparameter tuning, according to an example embodiment.

Insightful observations were made during this hyperparameter tuning phase. By evaluating the training and validation loss graph, it was observed that the loss peaked at 50 epochs, as illustrated by FIG. 4, showing the change of loss as a function of the number of epochs for both training and validation processes. The loss function measured the error of the model during its training phase. It quantified the difference between the predicted values by the model and the actual values in the dataset. The main objective during the training process was to minimize this error or loss.

Figure 5:
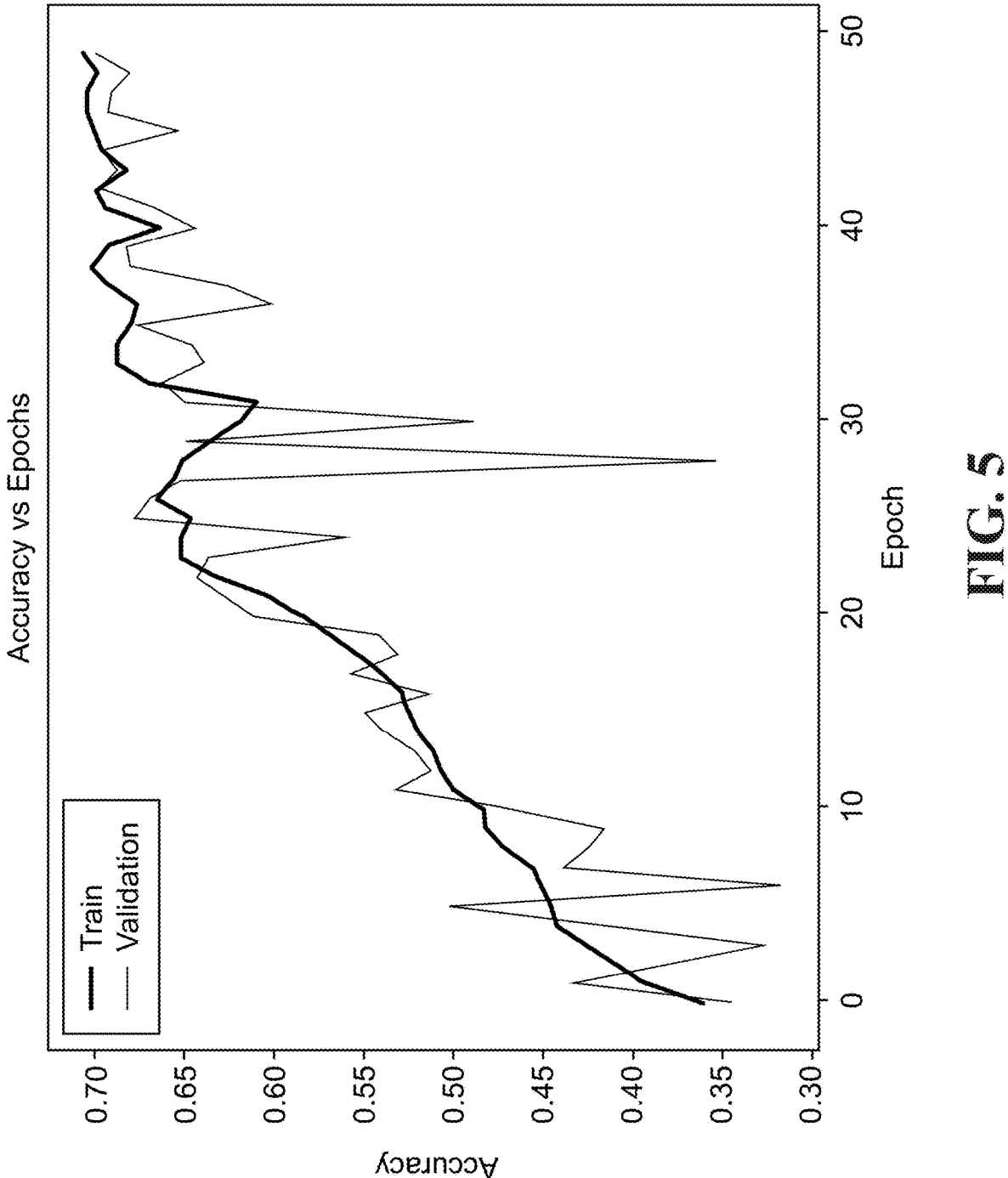
FIG. 5 depicts a plotted training and validation accuracy graph generated using data acquired during hyperparameter tuning, according to an example embodiment.

At the same time, the accuracy of the model was observed to peak at the same number of epochs, as illustrated by FIG. 5, showing the change of accuracy as a function of the number of epochs for both training and validation processes. Accuracy is a performance metric predominantly used for classification problems. It measures the proportion of predictions that the model got correct out of the total predictions made.

The idiosyncrasies of financial datasets, characterized by their susceptibility to anomalies and evolving patterns, presented unique challenges. In such a nuanced environment, the Adam optimizer proved valuable by effectively mitigating noisy gradients and dynamically adjusting learning rates. The final neural network-based model exhibited commendable results, registering an accuracy rate approaching 70%. For a detailed review of these accuracy results, reference is made to Tables 6 and 7.

TABLE 6

Training Results of Feedforward Neural Network
using the Disclosed Training Process

|  | Precision | Recall |
| --- | --- | --- |
| Pay Bills | 0.70 | 0.68 |
| Transfer Funds | 0.75 | 0.74 |
| E Transfer | 0.73 | 0.76 |

TABLE 7

Testing Results of Feedforward Neural Network
using the Disclosed Training Process

|  | Precision | Recall |
| --- | --- | --- |
| Pay Bills | 0.65 | 0.60 |
| Transfer Funds | 0.71 | 0.72 |
| E Transfer | 0.71 | 0.72 |

The basic impetus behind the development of this model was multifaceted. First and foremost, there was an intent to address the obstacles associated with user navigation within the digital application. In addition, there was a desire to improve the overall user experience. Finally, the goal was to streamline and accelerate user interactions, thereby reducing the duration of application engagement.

A notable comparison can be made with methodologies recently adopted by peer organizations in the industry. For illustrative purposes, one such organization achieved an accuracy of approximately 46% (see N. Chitsazan, S. Sharpe, D. Katariya, Q. Cheng, and K. Rajasethupathy, "Dynamic Customer Embeddings for Financial Service Applications," ArXiv, 2021. [Online]. Available:/abs/ 2106.11880). The introduced methodology stands in stark contrast and offers a fundamentally different approach. While that company leveraged a massive dataset and integrated users' financial contexts-including contextual account information and concurrent online activity—the current model according to the embodiments described herein differs significantly. Uniquely, this innovative model focused exclusively on user actions, such as clicking a button, or screen names that can be extracted from screenshots, avoiding the use of extraneous features. Sensitive, private, or confidential financial or transaction data need not be accessed or utilized in the training of the classifier or the use of the classifier for prediction.

The embodiments under discussion are based on the understanding that a user intention can be accurately discerned through the lens of their navigational sequences within the digital banking application, rendering the incorporation of detailed financial contexts unnecessary. Rather than relying on detailed financial profiles—which not only require extensive data collection, but can also raise privacy and security concerns—this model instead leverages navigation events occurring during user sessions. Such an approach helps to ensure agility and scalability by remaining agnostic to the evolving financial landscape and user behavior.

The use of navigation events and/or screen names for training the classifier or using the trained classifier to predict user intentions does not rely on or expose sensitive transactional or financial data. This is because the navigation events involve the user's actions, such as clicking a link or button, which are tied to the interaction itself only, rather than any confidential account information. The system captures the event of the click and/or the associated screen name, which reflects the interface or page where the action occurred. In other words, the information tied to these actions remains focused solely on the user's interaction, without extracting any sensitive data, such as the balance of the user's account, transaction details, or other financial records. The screen names themselves, which may be extracted from application coding (e.g., HTML or metadata), also reinforce the security, as they provide general identifiers for the interface without needing access to underlying sensitive data. As a result, the system remains focused on user actions while maintaining strict privacy standards, and thus the access to sensitive or personal financial information can be avoided.

The various embodiments described herein introduce a significant improvement in the prediction accuracy of user intentions within digital banking applications. By leveraging user navigation events, rather than relying on sensitive financial data or integrating extensive contextual information, the system simplifies the dataset and focuses on patterns of user interaction. The use of sequential navigation events in conjunction with a neural network enables the system to more effectively capture the behavioral tendencies of users, resulting in higher accuracy predictions. This is an advancement over previous methods, which, as described above, achieved only approximately 46% accuracy due to the inclusion of extraneous data and contextual dependencies. The approaches described herein reduce noise and irrelevant features, concentrating the classifier's attention on meaningful user actions, thereby improving the model's ability to predict user intention, such as transferring funds or paying bills. This increase in accuracy has a direct practical application, as it enables the system to guide users toward their desired user events without accessing their financial transaction data, thereby securely enhancing the overall efficiency and satisfaction of their experience within the digital banking platform.

Figure 6:
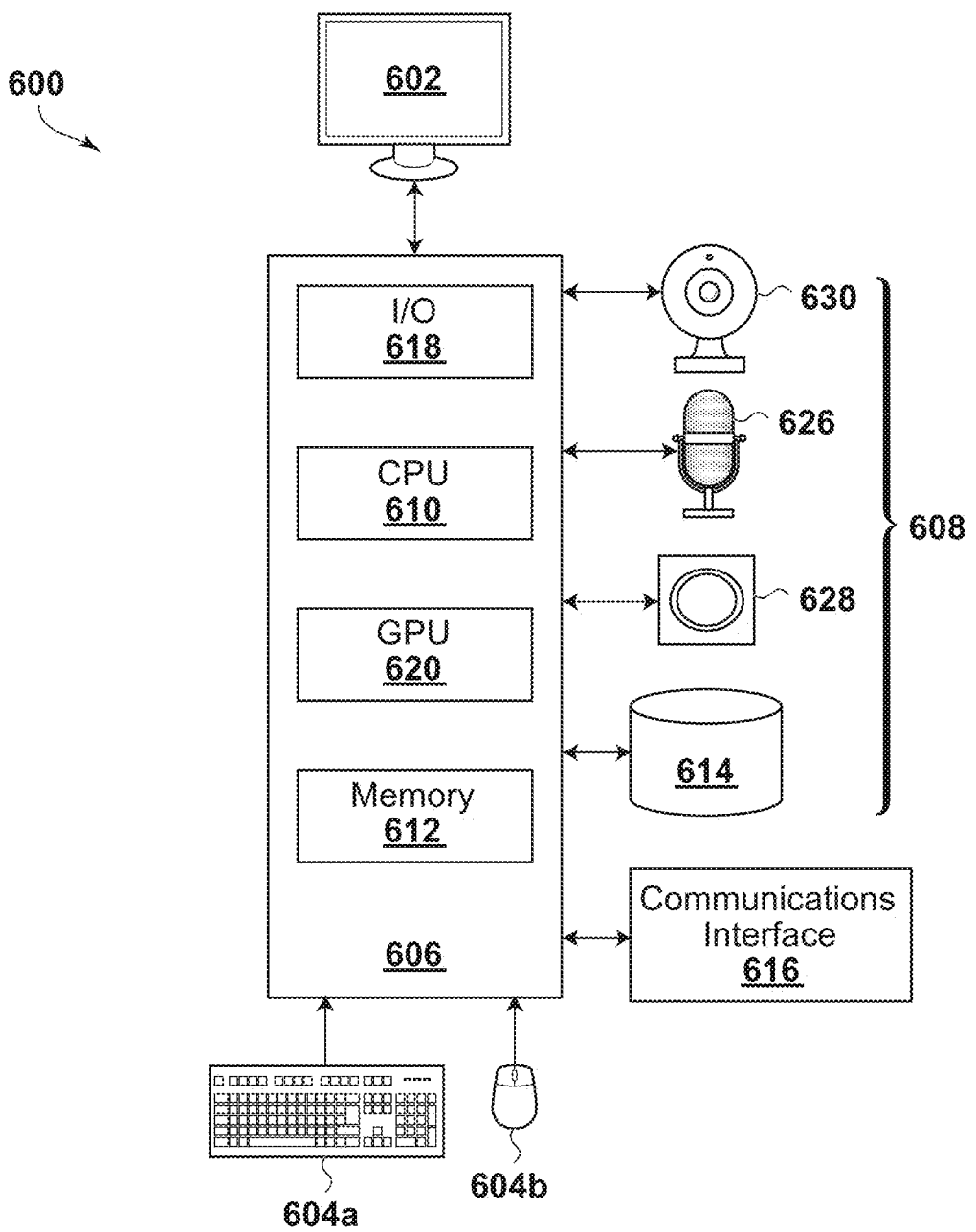
FIG. 6 depicts an example computer system that may be used to implement the method for user intention prediction, according to an example embodiment.

An example computer system in respect of which the intention prediction method described above may be implemented is presented as a block diagram in FIG. 6. The example computer system is denoted generally by reference numeral 600 and includes a display 602, input devices in the form of keyboard 604*a* and pointing device 604*b*, computer 606 and external devices 608. While pointing device 604*b* is depicted as a mouse, it will be appreciated that other types of pointing device, or a touch screen, may also be used.

The computer 606 may contain one or more processors or microprocessors, such as a central processing unit (CPU) 610. The CPU 610 performs arithmetic calculations and control functions to execute software stored in a non-transitory internal memory 612, preferably random access memory (RAM) and/or read only memory (ROM), and possibly storage 614. The storage 614 is non-transitory may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This storage 614 may be physically internal to the computer 606, or external as shown in FIG. 6, or both. The storage 614 may also comprise a database for storing a set of images as described above. For example, the datasets used in the experiments described above may be stored in such a database and retrieved for use in training.

The one or more processors or microprocessors are examples of suitable processing units, which additionally or alternatively may comprise an artificial intelligence accelerator, programmable logic controller, a microcontroller (which comprises both a processing unit and a non-transitory computer readable medium), or system-on-a-chip (SoC). As an alternative to an implementation that relies on processor-executed computer program code, a hardware-based implementation may be used. For example, an application-specific integrated circuit (ASIC), field programmable gate array (FPGA), or other suitable type of hardware implementation may be used as an alternative to or to supplement an implementation that relies primarily on a processor executing computer program code stored on a computer medium.

Any one or more of the methods described above may be implemented as computer program code and stored in the internal memory 612 and/or storage 614 for execution by the one or more processors or microprocessors to effect neural network pre-training, training, or use of a trained network for inference.

The computer system 600 may also include other similar means for allowing computer programs or other instructions to be loaded. Such means can include, for example, a communications interface 616 which allows software and data to be transferred between the computer system 600 and external systems and networks. Examples of communications interface 616 can include a modem, a network interface such as an Ethernet card, a wireless communication interface, or a serial or parallel communications port. Software and data transferred via communications interface 616 are in the form of signals which can be electronic, acoustic, electromagnetic, optical or other signals capable of being received by communications interface 616. Multiple interfaces, of course, can be provided on a single computer system 600.

Input and output to and from the computer 606 is administered by the input/output (I/O) interface 618. This I/O interface 618 administers control of the display 602, keyboard 604*a*, external devices 608 and other such components of the computer system 600. The computer 606 also includes a graphical processing unit (GPU) 620. The latter may also be used for computational purposes as an adjunct to, or instead of, the CPU 510, for mathematical calculations.

The external devices 608 include a microphone 626, a speaker 628 and a camera 630. Although shown as external devices, they may alternatively be built in as part of the hardware of the computer system 600. For example, the camera 630 and microphone 626 may be used to retrieve multi-modal content for use in training or at inference/test-time.

The various components of the computer system 600 are coupled to one another either directly or by coupling to suitable buses.

The term "computer system", "data processing system" and related terms, as used herein, is not limited to any particular type of computer system and encompasses servers, desktop computers, laptop computers, networked mobile wireless telecommunication computing devices such as smartphones, tablet computers, as well as other types of computer systems.

The embodiments have been described above with reference to flow, sequence, and block diagrams of methods, apparatuses, systems, and computer program products. In this regard, the depicted flow, sequence, and block diagrams illustrate the architecture, functionality, and operation of implementations of various embodiments. For instance, each block of the flow and block diagrams and operation in the sequence diagrams may represent a module, segment, or portion of code, which comprises one or more executable instructions for implementing the specified action(s). In some alternative embodiments, the action(s) noted in that block or operation may occur out of the order noted in those figures. For example, two blocks or operations shown in succession may, in some embodiments, be executed substantially concurrently, or the blocks or operations may sometimes be executed in the reverse order, depending upon the functionality involved. Some specific examples of the foregoing have been noted above but those noted examples are not necessarily the only examples. Each block of the flow and block diagrams and operation of the sequence diagrams, and combinations of those blocks and operations, may be implemented by special purpose hardware-based systems that perform the specified functions or acts, or combinations of special purpose hardware and computer instructions.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "connect" and variants of it such as "connected", "connects", and "connecting" as used in this description are intended to include indirect and direct connections unless otherwise indicated. For example, if a first device is connected to a second device, that coupling may be through a direct connection or through an indirect connection via other devices and connections. Similarly, if the first device is communicatively connected to the second device, communication may be through a direct connection or through an indirect connection via other devices and connections.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

It is contemplated that any part of any aspect or embodiment discussed in this specification can be implemented or combined with any part of any other aspect or embodiment discussed in this specification, so long as such those parts are not mutually exclusive with each other.

The scope of the claims should not be limited by the embodiments set forth in the above examples, but should be given the broadest interpretation consistent with the description as a whole.

It should be recognized that features and aspects of the various examples provided above can be combined into further examples that also fall within the scope of the present disclosure. In addition, the figures are not to scale and may have size and shape exaggerated for illustrative purposes.

What is claimed is:

1. A method comprising:
acquiring a pathway dataset excluding financial information as a user navigates in a digital banking application in a current user session, the pathway dataset comprising a time-ordered sequence of navigation events that have occurred in the current user session, wherein each of the navigation events is an interactive action by the user with an application interface of the digital banking application;

converting the pathway dataset into a sequence of latent space representations;

inputting the sequence of latent space representations to a classifier trained by:
acquiring a training dataset excluding the financial information, the training dataset comprising a plurality of historical navigation events, wherein at least one of the plurality of historical navigation events is annotated with one of a plurality of intention labels as ground truth;

converting the training dataset into at least one training sequence of latent space representations; and training the classifier using the at least one training sequence of latent space representations and the annotated one of the plurality of intention labels; and in response to the classifier identifying the sequence of latent space representations to be one of the plurality of intention labels, assigning the identified intention label as a predicted user intention; and suggesting a service corresponding to the predicted user intention via a graphic user interface (GUI) of the digital banking application.

2. The method of claim 1, wherein converting the pathway dataset further comprises vectorizing the sequence of latent space representations into a pathway feature vector, and wherein converting the training dataset comprises vectorizing the at least one training sequence of latent space representations into at least one training feature vector.

3. The method of claim 1, wherein the classifier identifies the sequence of latent space representations to be one of the plurality of intention labels in response to determining that a confidence level associated with the one of the plurality of intention labels exceeds a predefined confidence threshold.

4. The method of claim 1, further comprising recording, by a tracking service module, actions of the user as the user is navigating in the digital banking application in the current user session to generate the pathway dataset.

5. The method of claim 1, wherein the training dataset further comprises a plurality of historical identifiers of a screen of the GUI of the digital banking application, wherein at least one of the plurality of historical identifiers of the screen is annotated with one of the plurality of intention labels by the human.

6. The method of claim 5, wherein the pathway dataset further comprises a plurality of identifiers of the screen of the GUI that have occurred in the current user session.

7. The method of claim 1, wherein the plurality of intention labels comprise at least one of paying bills, transferring funds, or email money transfer.

8. The method of claim 1, wherein the training dataset is collected from a plurality of historical users, and wherein, for each of the plurality of historical users, the plurality of historical navigation events are from different user sessions of the digital banking application.

9. The method of claim 8, wherein the user is one of the plurality of historical users.

10. The method of claim 1, wherein the classifier has a feedforward neural network architecture characterized by five distinct hidden layers.

11. The method of claim 10, wherein the five hidden layers in sequence host 100, 250, 200, 100, and 50 neurons, respectively.

12. The method of claim 1, wherein the classifier has a convolutional neural network architecture comprising three 1-dimensional convolutional layers.

13. The method of claim 12, wherein the three 1-dimensional convolutional layers comprise 32 filters, 128 filters, and 128 filters, respectively, and wherein the three 1-dimensional convolutional layers have a kernel size of 3, 5, and 5, respectively.

14. The method of claim 1, wherein converting the training dataset further comprises:
in response to the historical navigation events in the training dataset that precipitate a first historical navigation event annotated with one of a plurality of intention labels being fewer than a predetermined number, padding the training dataset to meet the predetermined number; and converting the predetermined number of historical navigation events into the sequence of latent space representations.

15. The method of claim 14, wherein the predetermined number ranges from 30 to 70.

16. The method of claim 1, wherein at least one of the conversion of the training dataset or the conversion of the pathway dataset is performed using a look-up table or an encoder.

17. The method of claim 1, wherein the training dataset is acquired from a web analytics service used to monitor the digital banking application.

18. The method of claim 1, wherein the classifier has an output layer characterized by three neurons.

19. A non-transitory computer readable medium have stored thereon computer program code that is executable by at least one processor and that, when executed by the at least one processor, causes the at least one processor to perform a method comprising:

acquiring a pathway dataset excluding financial information as a user navigates in a digital banking application in a current user session, the pathway dataset comprising a time-ordered sequence of navigation events that have occurred in the current user session, wherein each of the navigation events is an interactive action by the user with an application interface of the digital banking application;

converting the pathway dataset into a sequence of latent space representations;

inputting the sequence of latent space representations to a classifier trained by:

acquiring a training dataset excluding the financial information, the training dataset comprising a plurality of historical navigation events, wherein at least one of the plurality of historical navigation events is annotated with one of a plurality of intention labels as ground truth;

converting the training dataset into at least one training sequence of latent space representations; and training the classifier using the at least one training sequence of latent space representations and the annotated one of the plurality of intention labels; and in response to the classifier identifying the sequence of latent space representations to be one of the plurality of intention labels, assigning the identified intention label as a predicted user intention; and suggesting a service corresponding to the predicted user intention via a graphic user interface (GUI) of the digital banking application.

* * * * *